United States Patent
Russell

(10) Patent No.: US 8,584,995 B2
(45) Date of Patent: Nov. 19, 2013

(54) VERSATILE CAMERA SUPPORT MOUNT

(75) Inventor: Sean Anthony Joseph Russell, Hove (GB)

(73) Assignee: Sean Anthony Joseph Russell, Hove (GB)

(*) Notice: Subject to any disclaimer, the term of this patent is extended or adjusted under 35 U.S.C. 154(b) by 0 days.

(21) Appl. No.: 13/066,759

(22) Filed: Apr. 25, 2011

(65) Prior Publication Data

US 2012/0138763 A1    Jun. 7, 2012

(51) Int. Cl.
   *F16M 11/02*     (2006.01)
   *G03B 17/00*     (2006.01)

(52) U.S. Cl.
   USPC ............ 248/177.1; 248/163.1; 248/188.6; 396/428

(58) Field of Classification Search
   USPC ......... 248/176.1, 177.1, 187.1, 176.3, 163.2, 248/188.2, 188.6, 188.8, 163.1, 166, 188, 248/133; 396/419, 428
   See application file for complete search history.

(56) References Cited

U.S. PATENT DOCUMENTS

| | | | |
|---|---|---|---|
| 3,704,848 A | 12/1972 | Trebes et al. | |
| 4,199,123 A * | 4/1980 | Weber et al. | 248/168 |
| 4,657,267 A | 4/1987 | Jaumann et al. | |
| 4,699,484 A | 10/1987 | Howell et al. | |
| 4,863,130 A | 9/1989 | Marks, Jr. | |
| 5,039,050 A | 8/1991 | Eidschun et al. | |
| 5,360,194 A * | 11/1994 | Jacobson | 248/431 |
| 5,649,257 A | 7/1997 | Kempka | |
| 5,826,121 A * | 10/1998 | Cardellini | 396/428 |
| 5,835,808 A | 11/1998 | Parker et al. | |
| 6,439,515 B1 | 8/2002 | Powers | |
| 6,557,775 B1 | 5/2003 | Brinson et al. | |
| 6,623,182 B2 | 9/2003 | Tatera | |
| 7,484,468 B2 | 2/2009 | Russell | |
| 7,604,208 B2 | 10/2009 | Tacklind | |
| 2002/0070319 A1 * | 6/2002 | Yu | 248/122.1 |
| 2005/0092877 A1 * | 5/2005 | Carnevali | 248/160 |
| 2007/0095246 A1 | 5/2007 | Heiligenmann | |
| 2008/0205876 A1 | 8/2008 | Tegland | |
| 2009/0114781 A1 | 5/2009 | McAnulty | |
| 2010/0008661 A1 | 1/2010 | Wood | |
| 2010/0040360 A1 | 2/2010 | Scott | |
| 2010/0086295 A1 | 4/2010 | Wood | |
| 2011/0023238 A1 * | 2/2011 | Orzeck et al. | 7/118 |

FOREIGN PATENT DOCUMENTS

GB       2433054       6/2007

* cited by examiner

*Primary Examiner* — Tan Le

(57) ABSTRACT

A compact and portable, multi-function camera support device. The modular and variable plurality of components provide alteration of the device's configuration, build size and structural attachment to respond to locations physicality and user requirements. A self-supporting device that can be orientated and attached in various positions upon any structure, vehicle or terrain. Inter-changeable linear frame members and complementary hub profile engagement plate inserts provide the structure and engagement of mounting collar combinations that can linearly re-position and circumferentially rotate. Collars and detachable articulating limbs are employed singularly or paired to connect; equipment mounting plates, limb sets, attachments or wheel sets. Enabling transformation from a single axis vertical bracket to a vehicle mount, scaffold mount, wheeled dolly mount, or rail track support for camera movement. The device provides vertical and linear re-positioning of mounted equipment as well as an adjustable gauge width for attached wheel sets and supported parallel rails.

21 Claims, 12 Drawing Sheets

VERSATILE CAMERA SUPPORT MOUNT

BACKGROUND OF THE INVENTION

This invention relates to a device and methodology for positional mounting and support of photographic and cinematographic cameras in variety of locations.

Filmmakers, photographers and surveyors require a variety of support tools to position and mount their cameras or instrumentation in difficult and challenging locations, positions and environments. Existing prior art of support and mounting apparatus are produced for either; a single location usage, purpose specific usage or camera weight and size dependent. None of which performs successfully as a multi-functional and easily transportable support device, operating in a variety of environments and locations. Traditionally equipment manufacturers target a specific end of the consumer or professional markets, where as today's film and television environment, the technical and operational differences are blurring. Presently cinematographers and broadcasters are integrating the physically smaller and lighter weight consumer or hybrid camera technology together with larger industry standard film production equipment, often on the same project. Much of the art of photography and filmmaking is performed by placing the camera in unconventional positions and locations that do not have flat planar bases, such as vehicles, irregular ground such as stairs, or upon scaffold. To achieve this a device permitting intuitive quick rigging and the versatility to adapt its build size and structural attachment in any orientation in response to a location's physicality and a users requirements would be of great benefit.

Existing systems of tripod's and central column bazooka mounts do not support equipment in any orientation other than with their base resting on the floor. Cantilevered support arms may be employed upon these systems but this introduces furthermore equipment and rigging. The invention aims to enable a user to erect the mounting device anyway up or in any orientation without compromising its integrity to support equipment placed upon it in a horizontal position or on any other angle. Furthermore it aims to provide vertical and lateral adjustability, without requiring additional, various sized spare riser sections to be added or stored. Prior art Bazooka systems have an equipment mounting height that is dependent on the chosen combination of individual riser sections. They also require a substantially large, flat and heavy base to provide stability to the mounted equipment; as such, they perform poorly upon irregular ground, stairs, steps and slopes. They usually employ a system that has a flat table base with three or four tubular vertical riser legs that can each be locked off at the required support height.

However, depending upon the legs height, the unused section of tube not positioned below the base plate for support, extends substantially above it, causing obstruction and a restriction of operation to the mounted equipment. This is especially true of legs positioned on a higher step or upper slope. Additionally any lateral repositioning requires the whole unit to be moved and re-stabilised. The alternative use of tripods rarely overcomes the problem because they suffer from the obstruction of a clear and sure foot position upon each steps tread by the upstanding leading edge of the steps next riser section. This is due to the tripods leg extending in an oblique direction across the risers uplift. Raising the tripods working height reduces the oblique angle towards the vertical but it increases instability as the legs extend vertically reducing the tripods balance footprint and raising its centre of gravity.

Bazooka column systems, tripods and offset arms perform with a single nodal point supporting a single mounted camera. However three dimensional image capture and multiple camera time slicing techniques are becoming more prevalent and as such the mounting of a dual or plurality of camera systems in a single plane, upon a tripods single nodal point creates a stability imbalance.

Presently operators often utilise a linear bearing system often called a slider or over-shooter, this is attached upon a tripod, however it still does not overcome any weight transfer imbalance due to operational usage which in turn exerts an undesirable twisting force upon the linear slider bearing and as such, limits its length, and much care must be taken when removing or repositioning cameras. Such a set up usually necessitates additional support legs or stays to be added, these extend vertically downwards to the base level or the stays extend back to the supporting tripod. This arrangement does not substantially broaden the balance footprint beyond the sliders width, which is invariably narrower that the supported equipments footprint, so critical balance of the camera is necessary often limiting the scope of support to small lightweight cameras. Additionally a problem with many flat bed sliders is the noise generated by the wheels or rollers travelling upon the guide track. Their generally flat planar bases create a sounding box, amplifying the travelling noise level and often restricting its use to non-critical sound sequences.

To date much prior art utilises a prescribed and multiple number of single item components, all of which is integral to the devices construction. Often assembly is time consuming and over complicated and the omission of a single leg or foot component renders the unit unworkable or unbalanced, however there are times when due to rigging difficulties or the physical nature of the attaching structure, the orientation, plurality and alignment of components needs to be altered for effective and safe construction. Existing mounts do not readily allow for such alteration of their assembly configuration, consequently users employ an additional apparatus or construct a one-off single usage support tool, or simply compromise by choosing an alternate location.

The use of a cantilevered single arm equipment support in wild life filming or environmental monitoring is often quite rudimentary and prior arts do not provide alterations to height, inclination and position away from the support structure after it has been secured in position. Any small alteration requires the unit's complete removal and repositioning. The inventions embodiment as a single axis, vertical arm support, strapped securely around a tree overcomes many of the fore mentioned problems and additionally is less environmentally damaging than other methods of support, for example Tatera U.S. Pat. No. 6,623,182, which screws into the tree structure.

Prior art from Russell GB 2433 054 comprises of a buoyant mount with the limbs mounting collar, pivot and articulation points, integrated into each legs shoulder, a problem occurs when the circumferential rotation of legs into an upward position about the central shaft causes legs to pass vertically through a cameras angle of view, when its view point is along the central frame member.

The absence of a twin limbed bridging collar prevents contra-lateral limb sets from sitting in the same plane, as they are always axially offset from each other. Due to its particular design, construction techniques dictating its mode and method of operation the prior art is not easily adapted to function in alternate embodiments other than as a water support mount.

BRIEF SUMMARY OF THE INVENTION

Other units cited in prior art attempt to address some of the issues mentioned but mainly fail on specific and limited single environment and application usage.

Prior Art includes:
U.S. Pat. No. 4,199,123 Tripod levelling mechanism—Weber/Hughes Aircraft Co Apr. 22, 1980
US 2009114781 (A1) Support for a camera McAnulty/Ronford Baker May 7, 2009
U.S. Pat. No. 7,484,468 B2/GB 2433 054 Sean Russell Buoyant mount for supporting cinematographic apparatus Feb. 3, 2009
U.S. Pat. No. 6,439,515 B1 Video camera support Powers Aug. 27, 2002
U.S. Pat. No. 3,704,848 (A) Mounting & levelling pad Trebes et al Dec. 5, 1972
U.S. Pat. No. 4,863,130 Adjustable device mounting camera to surface by a vacuum Marks Jr Sep. 5, 1989
U.S. Pat. No. 7,604,208,B2 Height Adjustable Platform Levelling Multi-pod Tacklind Oct. 20, 2009
U.S. Pat. No. 5,835,808 Vehicular Camera Mount Peter W Parker Nov. 10, 1998
U.S. Pat. No. 5,039,050 Equipment Mounting Apparatus Robert W Eidschun Aug. 13, 1991
U.S. Pat. No. 5,649,257 Tree mounted camera support Scott A. Kempka Jul. 15 1997
U.S. Pat. No. 6,623,182 B2 Hunters tree-mounted camera mount Tatera Sep. 23 2003
Pub US 2010/040360 A1 Camera mount Scott Dean Feb. 20, 2010
Pub US 2008/0205876 Apparatus for mounting motion picture camera equipment Skyler Tegland
U.S. Pat. No. 6,555,775 B1 Dolly track rail Brinson et al May 6, 2003
Pub US 20100008661 Camera slider system Wood Dennis Pub Jan. 14, 2010
Pub US 2010/0086295 A1 Camera mounting system Wood Pub Apr. 8, 2010
Pub US 2007/0095246 A1 Portable camera dolly & track Heiligenmann May 3, 2007
U.S. Pat. No. 4,699,484 Rail mounted camera system Howell Oct. 13, 1987
U.S. Pat. No. 4,657,267 Motion picture or television camera stand Jaumannn Apr. 14, 1987

To overcome many of the limitations and restrictions of the prior arts the invention aims to provide a device, system and/or method for a versatile multi-discipline, compact and portable support apparatus for mounting photographic, cinematographic and surveying equipment in a variety of field locations. Its transformation into various operational embodiments, such as a static mount, a vehicle mount, a moveable carriage, or rail bearing support is drawn from its modular assembly of an inter-changeable central frame member interacting with an extendable and detachable plurality of limb components, mounting collars and equipment mount plates, permitting the highly desired rapid install and removal of the device.

The preferred embodiment of the apparatus consists of a longitudinally outer splined tubular frame member used in conjunction with a detachable equipment mounting plate fixed upon and supported by mounted collar cap sets, each separate and independent from the support limbs collar-mounting sets, attached to a plurality of supporting limb sets. The splined profile engagement of the frame member and a mounting collars assembly prevent the collar and mounted equipment rotating around the circumference of the frame member.

It is an objective of the invention to provide a support apparatus that can be self-supporting and positioned in any orientation, for example, upside down or vertically, and still enable the equipment mounting plate to be positioned about the central frame member in a horizontal over-slung mode, or alternatively in an under-slung mode, or set at various incremental 'Dutch' angles about the splined frame member's circumference. Each support limbs radial position may have a different angle of perpendicular rotation than other limb sets as well as differing limb member configurations, allowing flexible adaptation whilst positioning. Consequently this permits the devices structural attachment upon irregular surfaces, steps, slopes, vehicles, scaffolding, lamp post, railings or I-beams.

The invention utilises a central frame member set lower than the equipment mounting plate, this method of component construction creates a triangular truss reducing flex and twist, increasing the inventions stability and strength.

It is a further objective of the invention to consist of a detachable equipment mounting plate that can be removed and used independently as a stand alone hi-hat support base, either placed directly on the floor or attached with clamps or suction pads for low angle equipment support upon vehicles, structural scaffolding or attached with wheel sets or slidable linear bearing assemblies for use as a low profile dolly carriage. The detachable equipment mounting plate incorporates a set of stepped concentric location rings to enable a range of camera package sizes, weights and associated equipment to be mounted upon the device, providing effective support for either professional or consumer equipment upon the same set up.

It is an objective of the invention to provide releasable linear displacement of the mounting collars and support limb sets along the central frame member. The linear displacement of mounted limb sets alter the supporting limbs gauge width, consequently the inventions base size and weight balance footprint is altered. This permits a user to shift the inventions central balance point to counter a change in balance or size of any supported equipment, maintaining equilibrium particularly when supporting a plurality of cameras and associated equipment.

It is a further objective of the invention to provide vertical adjustability. This is effectuated by the symmetrical positioning of each limb components perpendicular rotation about its mounting collars inter-connection point or alternatively by means of each limbs single sided collar mounts profile insert plates circumferential engagement with the central frame member. Alteration by either method causes a change in height of the equipment mount plate.

It is an objective of the invention to enable alternate central frame members to be selected depending on the users requirements. This is enabled by means of an inter-changeable profile plate insert, set within each collar mountings central aperture. The selected insert plate's internal aperture mirrors the external profile shape and dimensions of the selected central frame member, for example, the use of a length of standard scaffold tubing, a triangular or hexagonal profile of aluminium extrusion or a longitudinally outer splined tube. This compatibility permits varying lengths and strength of central frame to be employed.

The central frame member's inter-changeability permits users to travel on assignment with a reduced number of components and source locally, a standard sized replacement for the central frame member at a length and profile shape that is required.

It is a further objective of this invention to create a method of manufacture and component construction that enables the inventions limited number of components to be interchangeable, non-side specific and easily adapted into alternate forms of embodiment. This method of use and assembly is key to its simple build up or down versatility, reducing the number of spare part components required in case of loss or damage. Assembly combinations of two collar mounting case components, the single sided mount collar and the collar cap, allow the user to configure the invention in a manner that best suits the function the device is to perform. Differing combinations of collar sets can construct either an independent single limb mounting collar, a bridging collar for two opposing and connected limb sets, or an independent equipment mounting collar, and when positioned in an inverted manner, the collar cap mount can provide a flat base to which attachment may be made to support the central frame member if no limb sets are used, for example, on a flat planar base or for affixing wheel sets in transforming the central member into a moveable carriage travelling on linear rails or wire cable.

It is a further objective of the invention to provide a stable support apparatus with a variable number and differing combination of supporting limbs. The construction of various embodiments may require the support limbs to be slidably positioned irregularly along each side of a central frame member. Not always in a four legged square or rectangle configuration. With consideration to mounting upon vertical or oblique structures such as car doors, railings or sign posts, the central support members load bearing underside will have a plurality of support arms rotated and positioned extending in a downward manner. The limbs arcuate profile combined with the rotational inter-connection points cantilever the device and the supported equipments load force into abutment with the mounting structure. Where as the upper side of limb support set level with or above the central frame member, tying the apparatus into the structure, can exhibit a limited or reduced number of limb sets. The distance of outward suspension of the mounted equipment from the fixing structures vertical or oblique face can be altered by setting various angles of articulation about the limb members and mounting collars inter-connection points.

The plurality of limb sets can be further reduced to two, an upper and a lower, set in the same vertical axis attached and bridged together by a double mounting collar to act as a single stemmed vertical mounting bracket. Enabling discreet cantilever positioning upon vertical structures such as: trees, signposts and railings of lightweight equipment for wildlife, environmental or surveillance filming. The mounting collars threaded fixing apertures located on its upper face can provide an attachment point for the direct mounting of equipment. With this embodiment a central frame member need not be employed. In the case of securing to trees and signposts, the use of a single releasable ratchet strap or band attached to the foot stanchion will provide sufficient attachment.

It is a further objective of the invention to provide an assortment of attachment and rigging points within the device for standard rigging components to be adapted into the devices onsite construction and support. Circular apertures within the central leg limb to allow scaffold tube, SpeedRail® or camera accessory tubing to pass through, this permits the device to either simply attach to a structure or to be integrally built into it. The threading of ratchet straps through the tubular central frame member when tying down the unit provides an effective central tie down point for the whole unit eschewing the need for multiple straps and multiple points of tie down, eliminating straps crossing over the working surface of the device and fouling the use of the supported equipment. This is most evident when working as a car bonnet mount.

It is a further objective of the invention to provide a mounting system with inter-changeable foot attachments that can transform the apparatus into various support embodiments including a stand alone low level mount, vehicle mount using suction cups, structural mounting by means of releasable clamps and straps, a moveable dolly with wheel sets or a cable dolly with concave wheel sets. This is achieved by means of the foot also acting as a stanchion-receiving element with an integrated detachable locking mechanism. This attachment system also provides the ability for the user to also utilise industry standard film grip spigots as the attachment element for foot attachments.

It is a further objective of the invention to provide a strong and stable linear base for support when a plurality of instruments or cameras are required in the same plane for example; on three dimensional filming projects, or time slicing filming techniques. The benefit of a single longitudinal bearing ensures the cameras linear alignment, and eschews the clutter of a plurality of tripods, support stands, stays and brackets that are required in order to support a multiple of cameras. The length of central frame member, and plurality of support limbs depends upon the location and the users requirements. The linear support beam also permits quick and easy lateral displacement and positioning of any mounted equipment or instrumentation. The device is structurally supported along its entire length and mounted equipment is positioned within the support limbs balance footprint. This contrasts to the method of placing a short linear support bearing or slider on a tripod's single nodal point, to support a plurality of cameras. With the single nodal support method there is always the danger of the structure becoming imbalanced when equipment is operated, moved, adjusted or removed. Also a slider system does not permit a plurality of equipment to be mounted above and below the main bearing at the same time. Whereas the invention can also accommodate a plurality of over slung and under slung mountings set up at the same time.

It is a further objective of the invention to provide a travelling dolly carriage with an adjustable gauge width for wheel set attachments. Wheels sets can be attached to each foot assemblage or to inverted collar cap mounts that subtend the central frame member, this transforms its embodiment into a moveable carriage. The width of opposing wheels sets are altered by the linear displacement of the mounting collars along the central frame member. Therefore providing positional alignment of the wheel sets to the width of any gauged track or bearing. This is effectuated by ensuring that the dolly carriage's central frame member is positioned transversely to the tracks running direction. The height of the supported equipment can also be altered by methods aforementioned when twin limb collar sets and contra-lateral limb members with attached wheel sets operate in a single plane.

In order to support the dolly carriage the device also provides a mounting and support apparatus for a parallel rail slider system. The parallel gauge width of the supported rails can be altered by means of adjustable rail clamps positioned within a linear T-slot profile bar, attached upon the mounting collars, and set at a gauge to suit the supported equipment.

The lower central frame member combined with the parallel running rails creates a lightweight and strong triangular truss. Combined they form a strong structural base and permit the use of lighter materials and longer rails to be used in the construction of the rail or central frame. Consequently it can be broken down into a smaller and lightweight transportable package than current shorter length sliders.

In a preferred embodiment, the central frame member, mounting collars, cap collars and limb sets are manufactured out of aluminium with the advantage of being lightweight and strong. Alternatively the components could be fabricated from other materials such as various alloys, carbon fibre or carbon composite material.

BRIEF DESCRIPTION OF THE SEVERAL VIEWS OF DRAWINGS

An example of the invention will now be described by referring to the accompanying drawings.

Figure 10:
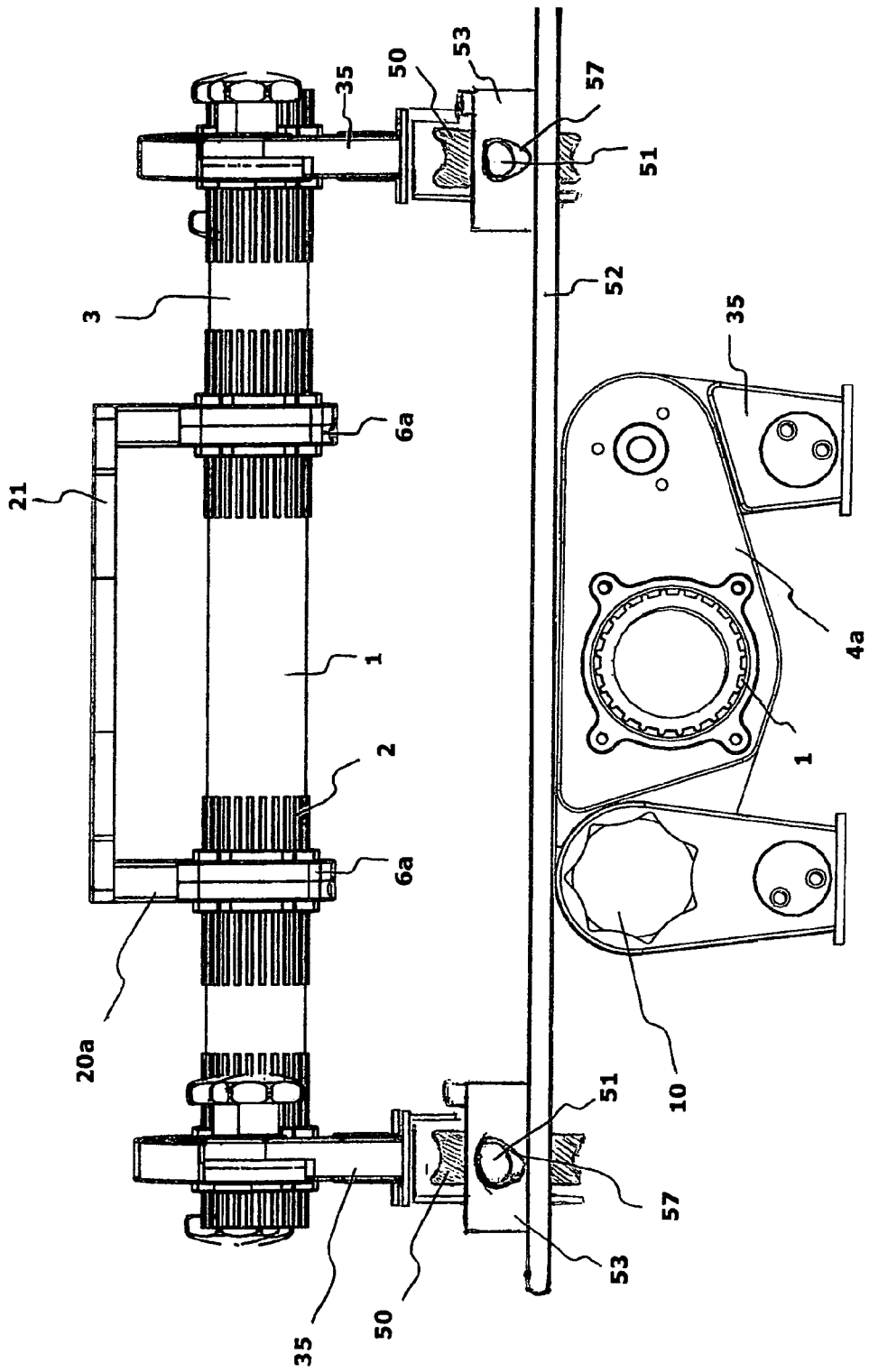

FIG. 10 Shows an end view of a low dolly with feet directly mounting dual sided collars and wheel sets attached. A mounting plate on separate and independent collar cap mounts. The travelling carriage positioned upon parallel rails supported by the device in a low mode.

Figure 11:
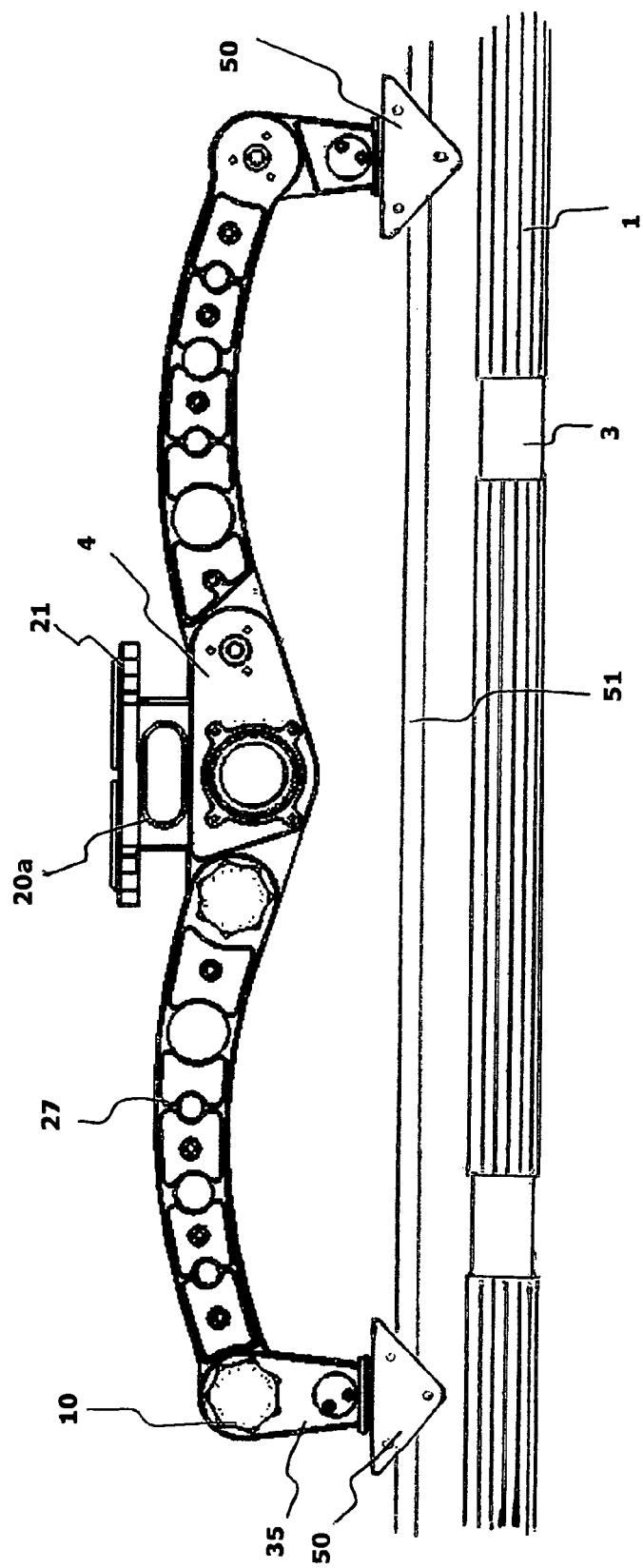

FIG. 11 Shows a side view of an adjustable height dolly with limb members and wheel set attachments positioned upon the rail with the central frame member directly below.

Figure 12:
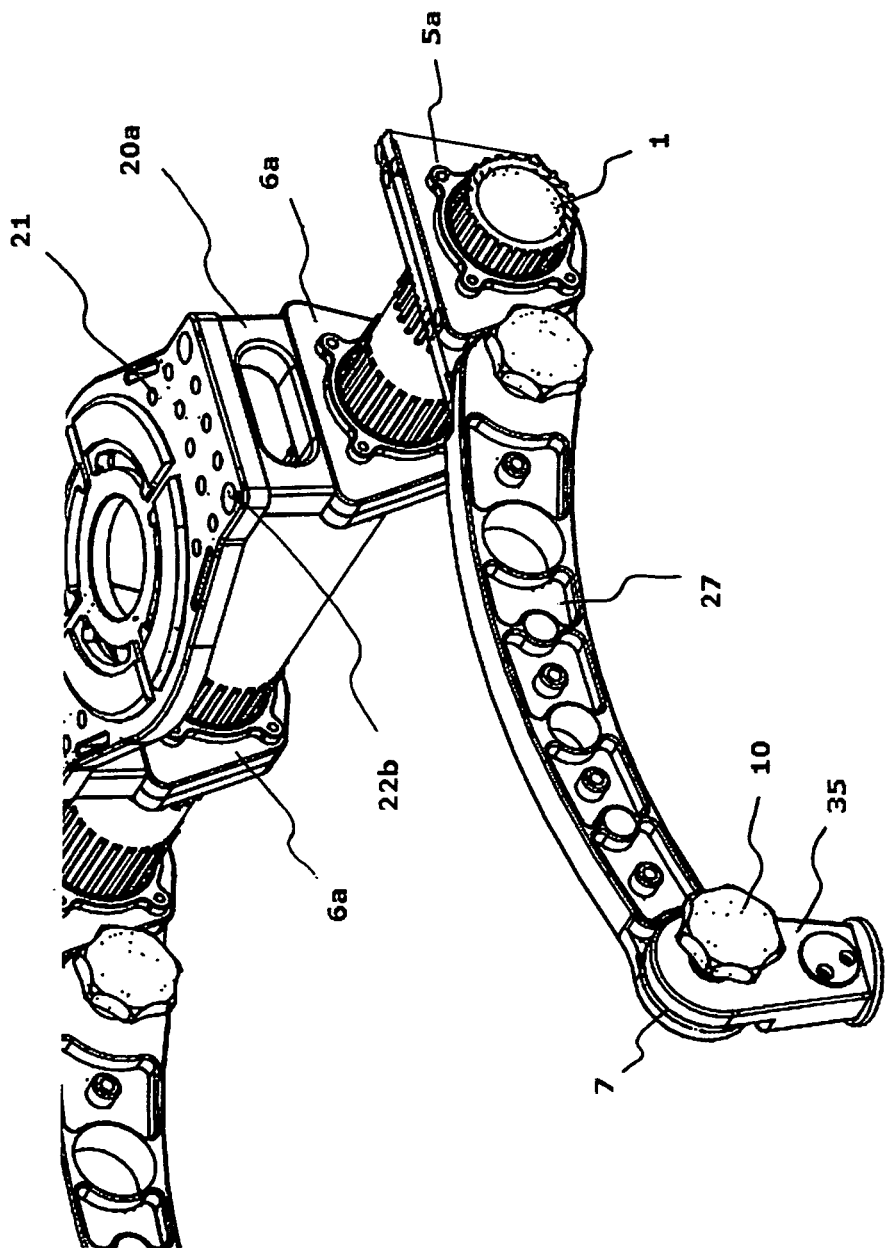

FIG. 12 Shows a view of the device employing a single limbed and single sided mounting collar. Together with a separate and independent equipment plate supported by collar cap mounts.

DETAILED DESCRIPTION OF THE INVENTION

The invention consists of a plurality of support limbs circumferentially articulating perpendicularly about a tubular central frame member. The central frame member's function is; firstly to provide the strength and stability required to bridge the longitudinal spacing of mounting collars and each collars contra-lateral articulated limb sets. Secondly it acts as an attachment bearing to permit instrumentation and equipment to be positioned and fixed upon it.

Figure 1:
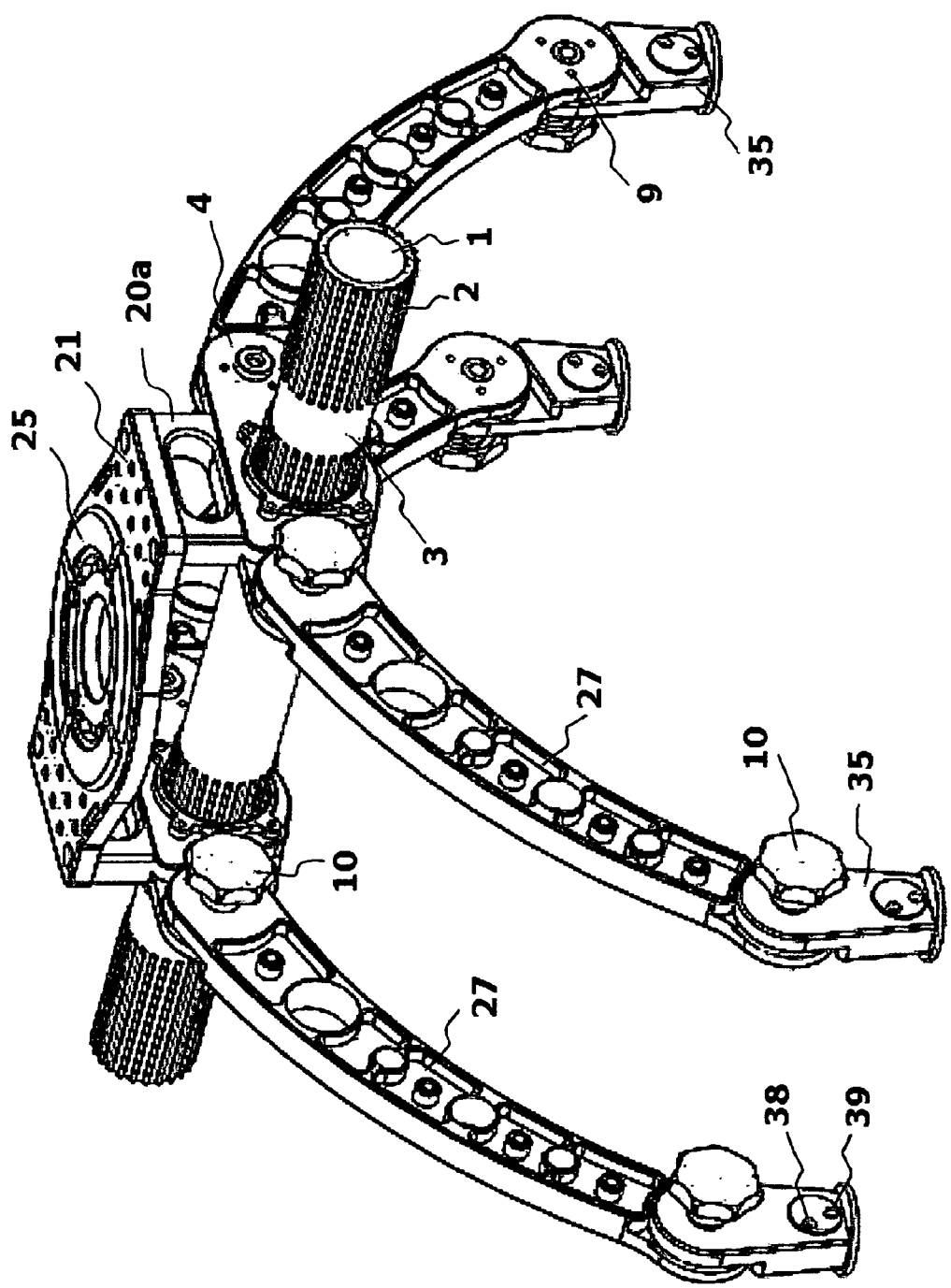
FIG. 1 Shows a top perspective view of a preferred embodiment of the unit in an elevated high mode, with the equipment mounting plate directly mounting the dual and axially aligned support collars. Each support collar is attached at its opposing inter-connection points to a set of articulating limbs.

A preferred embodiment as illustrated in FIG. 1 utilises a longitudinally splined central frame member 1. This permits altering the various perpendicular circumferential angularities of support limb sets 27, 35 and mounting collars 4 between it and with relation to other support limbs 27, 35 and mounting collar sets 4, 5a.

The assembly of the splined shaft member 1 and the internally splined mounting collar 16 (FIG. 4) is by means of both members having a corresponding splined tooth, castellation profile 16a. The outer circumferential splined section 2 on the central frame member 1 is threaded through the corresponding internally circumferential splined hub 16a on each mounting collars profile insert plate 16. The threaded engagement of the two longitudinal mating splines permit the mounting collars 4, 5a, 6a to traverse along the splined shaft and to be positioned to support any equipment/instrument or limb set along the central frames 1 horizontal axis. The splined arrangement secures each collars rotational orientation about the circumference of the central frame member 1, preventing rotational slippage. Each mounting collars 4,5a, 6a perpendicular angle to the central frame member 1 is dependent upon the rotational position of the collar. Changing the circumferential angular axis between the collars 4, 5a, 6a and the central frame member 1 results in a change in inclination or declination of each collars top flat faced equipment mounting surface 15, and consequently the radial positioning of attached limb sets.

The rotational movement of a plurality of singular limbed mounting collars 5a about the splined central member 1, as illustrated in FIG. 12, will have the effect of raising or lowering contra-lateral limbs members arched like configuration. This alters the height at which the device or supported camera will be positioned relative to the ground or base level.

Figure 2:
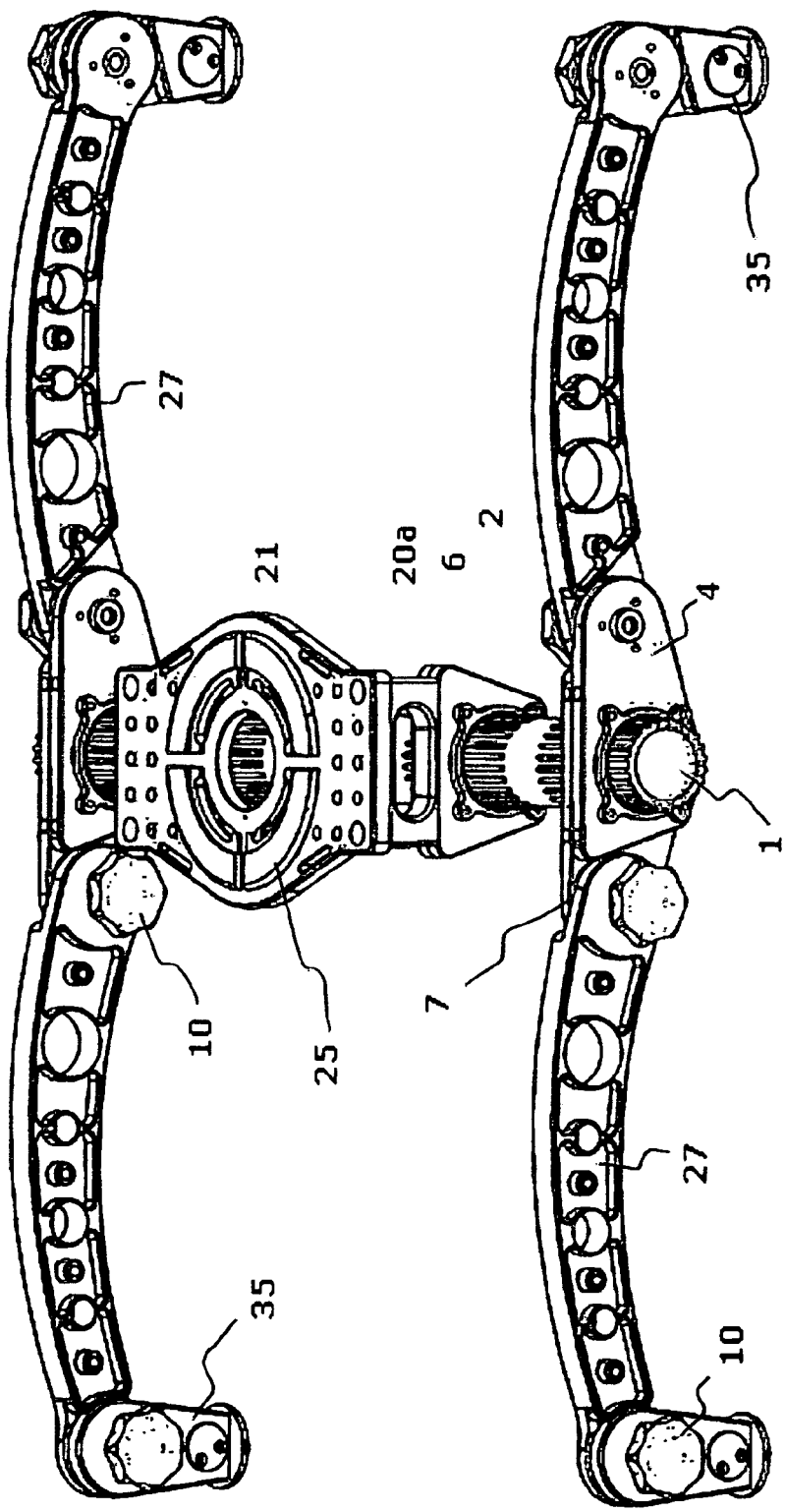
FIG. 2 Shows a side perspective view of the unit in a low mode, an alternate embodiment with separate dual limb collar mounts and the equipment mounting plate positioned on separate and independent collar supports.

Using FIG. 2 to illustrate that if an embodiment of a dual limbed mounting collar 4 is used the height can be preferably adjusted by way of the circular ball detent inter-connections 7 on the limb components 27, 35 and mounting collars 4, 5a (FIG. 12) distal ends. Undoing the central locking knob 10 and disengaging the ball pins 12 (FIG. 5) and detent plates 8 permits the opposing and complementary engagement plates to be separated and rotated into a desired limb angularity and locked in engagement. This vertical adjustment of the device is illustrated in its vertically high mode position as shown in FIG. 1 can be compared to its vertically low mode shown in FIG. 2

The device's mounting collars 4, 5a(FIG. 12), 6a engagement with a chosen frame members profile insert 16 (FIG. 4) facilitates the longitudinal and rotational placement of collars along the central frame member 1. One embodiment of the mounting collars 4 according to FIG. 2 is as a bridge for two separate and opposing sets of support limbs comprising of single or concatenated limb members 27, 35, set about the collar 4 or 5a in the same linear axis but each with the ability to articulate about the inter-connective pivot attachment point 7.

Figure 4:
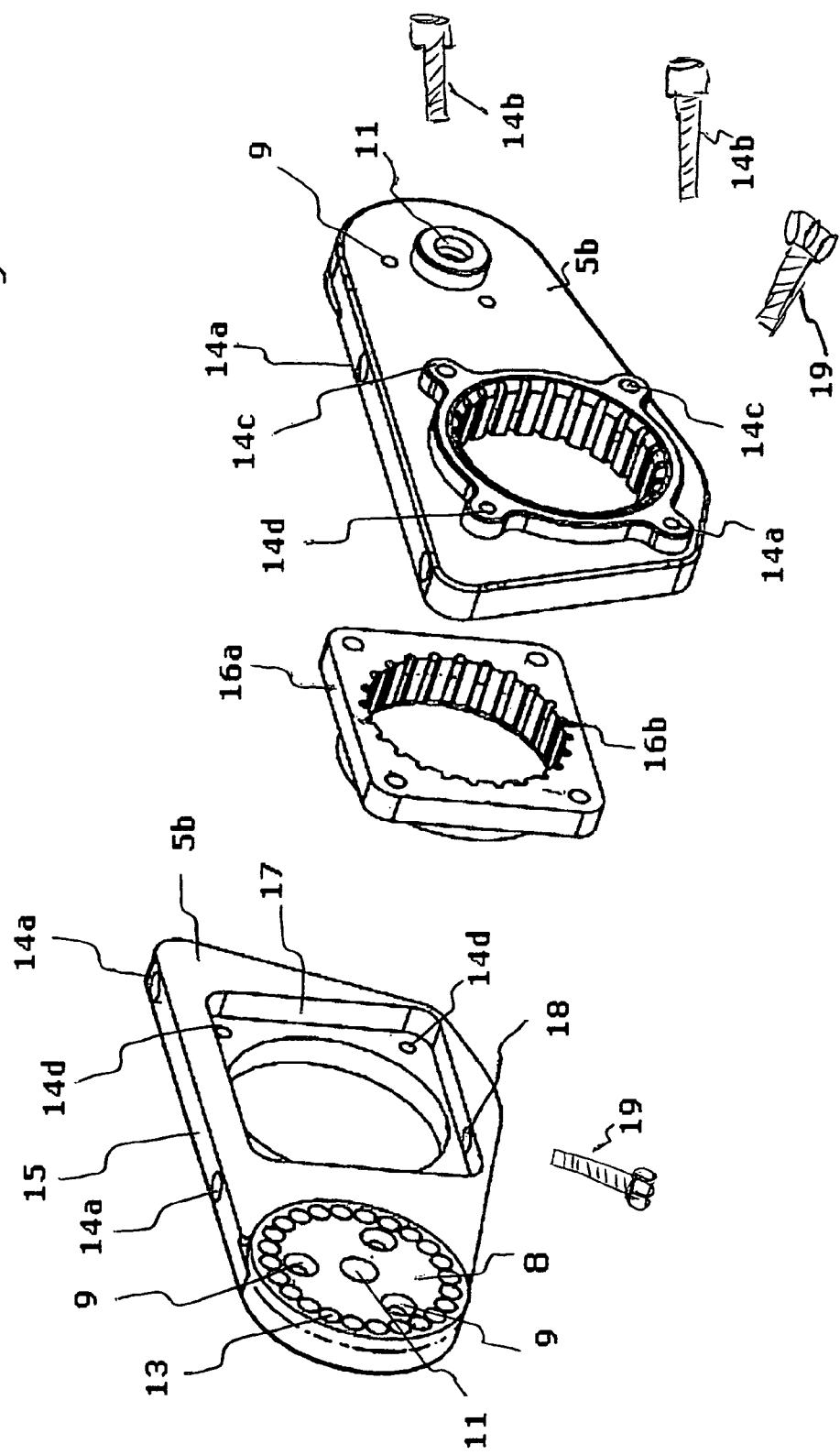
FIG. 4 Shows an exploded view of dual sided collar support with attachment point for detent disc and adjustable limb members, with internal hub profile engagement inserts.

Each collar set is kept in lateral alignment along the central frame member 1 by way of perpendicular threaded locating screws 19 as shown in FIG. 4 extending and passing through aligned threaded holes 18 from each collar plates 4, 5a, 6a underside, through the inner profile plate 16 and abutting against the engaged central frame members 1 outer side. Nylon threaded screws 19 are used to reduce pitting & burring the central frames 1 outer face.

Furthermore the top flat face 15 of each mounting collars configuration provides two threaded apertures 14a, fixing points for attaching an equipment mounting plate 21 spanning between two spatially apart collar sets 4, 5a, 6a forming a linear bridge. Alternatively equipment can be mounted directly onto the collars threaded inserts 14a with the use of a double-ended thread attachment screw. The free axial rotation channels 3 spatially located along the central splined frame member 1 allow un-impeded adjustment of a collars rotational orientation, without it having to be unthreaded from the length of central splined frame member 1. To axially align the collar at the required perpendicular angle, a collar 4, 5a, 6a can be released and slide linearly into the free spline area 3 and be aligned in its required rotational position and pushed back onto the splined section 2 of the central frame member 1.

Figure 9:
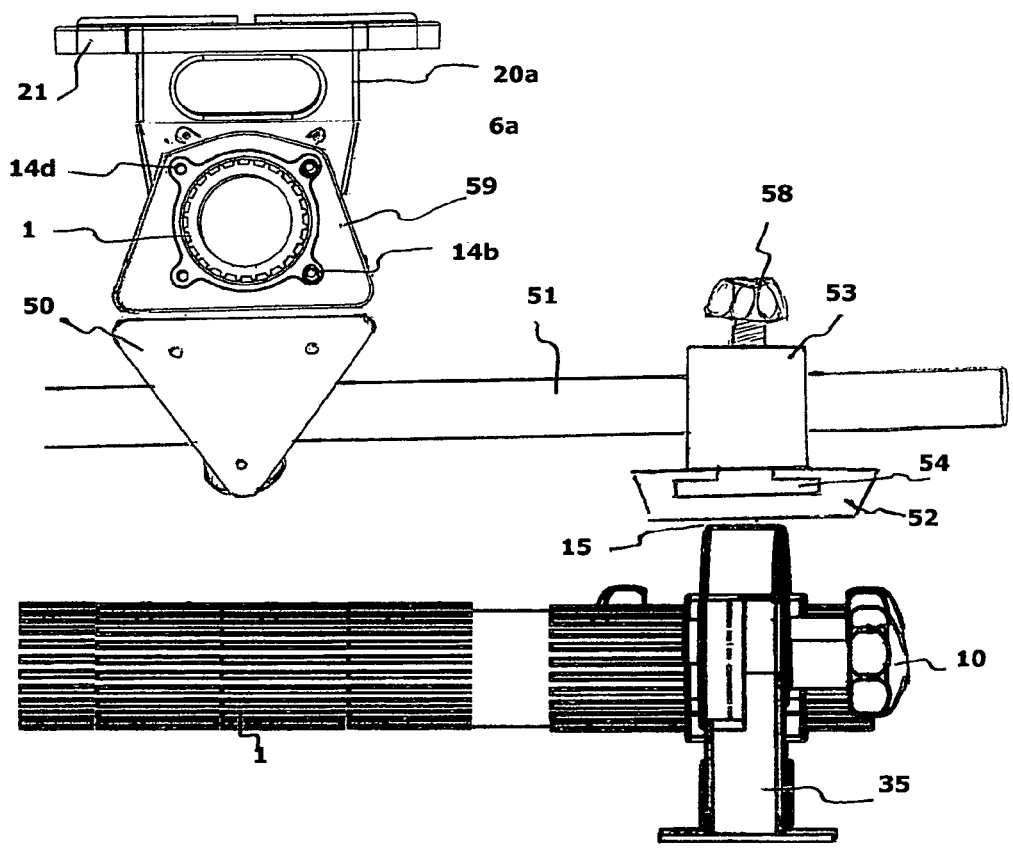
FIG. 9 Shows a side view of dolly carriage with an inverted collar cap directly attached to wheel sets, running on a rail system with T-slot profile and rail clamp supporting the rail.

The mounting collars have three separate embodiments, illustrated by using FIG. 4 and FIG. 12, firstly as a dual sided twin limb bridging mount 4; consisting of two single sided mounting plates set back to back 5b. Secondly, as a single sided limb collar 5a mount, this assembly is by way of a single mount plate 5b set back to back with a collar cap cover plate 6b. Thirdly, as a single bracket collar mount 6a with no limb attachment points, this comprises of two identical mounting collar caps cover plates 6b set in congruent alignment by way of four threaded screws 14b. Two screws 14b on each plates outer face, with an internally placed mounting collar profile insert plate 16, and spatially aligned mounting holes 14a on its upper face. Combined they form an axially positional mounting collar suited for the direct fixing of an equipment mounting plate 21 when positioned spatially apart in pairs. When positioned in an inverted manner subtending the central frame they form a flat base for placement on a flat planar surface when supporting limb sets are not required. Alternatively as FIG. 9 shows, this subtended mode permits the attachment of wheel sets 50 for carriage travel on parallel linear rails or wire cables.

FIG. 4 illustrates an exploded view of a dual sided collar set. They consist of two identical, single sided mounting collar plates' 5b, set back to back in congruent alignment. Located between each collars inner face, a profile insert plate 16 is inserted to act as the central frame member's 1 engagement component, the use of acetyl for profile engagement insert plates 16 reduces frictional wear between the plates 16 and the aluminium or steel frame member 1 when positioning the collars 4, 5a, 6a. Each mounting collar configuration is a combination of two differing or same collar plates, the single sided plate 5b and the cap plate 6b together with two internal profile plate inserts 16 drawn together.

The principal embodiment of this device utilises a tubular outer splined central frame member 1. However the unit may utilise an alternate central frame with an external shaped profile that is mirrored in design by the swappable profile engagement plates 16 inserted in each mounting collars internal profile plate locating recess 17. This facilitates the acceptance of commonly available extruded profiles. Changing the central frame member's 1 profile permits variances in length, strength or equipment attachment, where by T-slot profiles found on many aluminium extrusions may also be utilised for attachment.

Each dual limb collar 4, single limb collar 5a and collar cap 6a plates assemblages utilise four spatially positioned threaded bolts 14b, two on each opposing collars face to align and draw together the opposing plate. Each mounting collar/cap's two opposing external face plates house two through holes 14c with a recessed housing for two bolt heads 14, plus two internal face threaded holes 14d to receive an aligned bolt 14b from the opposing mounting collars plate 5b, 6b. When the opposing bolts 14b through holes 14c and threaded holes 14d are aligned, the bolts screwed engagement draws the plates together sandwiching the two internal profile plate inserts 16 located in each plates internal locating recess 17 into a single collar mounting unit 4,5a, 6a.

According to the detached and exploded view in FIG. 4 each single sided mounting collars 5b shoulder is further characterised by an inter-connection point 7. A circular ball pin detent plate 8, a female mechanism for each leg and foot limb members male locking element to inter-connect with. The single axis articulating inter-connection point 7 centres around a threaded engagement hole 11 for a central locking screw 10, integrated within the circular steel disc plate 8 mounted onto the collars 5b fixing point by threaded screws 9, extending into the collars inner shoulder surface. Independently fixing the steel-Mating disc 8 in position. The discs integrated threaded engagement hole 11 and pivot point aligns with each limb member's 27, 35 shoulder through hole 7,36.

The steel discs 8 exposed surface has a plurality of detent holes 13 disposed in a circular pattern around the central threaded engagement hole 11. The circular detent hole spacing is set at rotational increments of 15 degrees centres, providing a total of 24 fixed position locating detents 13, providing securing points to axially lock a pivoting limb member. The use of replaceable steel disc plates on each components female element intersection points 5b, 29 limits wear and degradation of the main collar 4, 5a, 6a and limb 27, 35 components.

Figure 6:
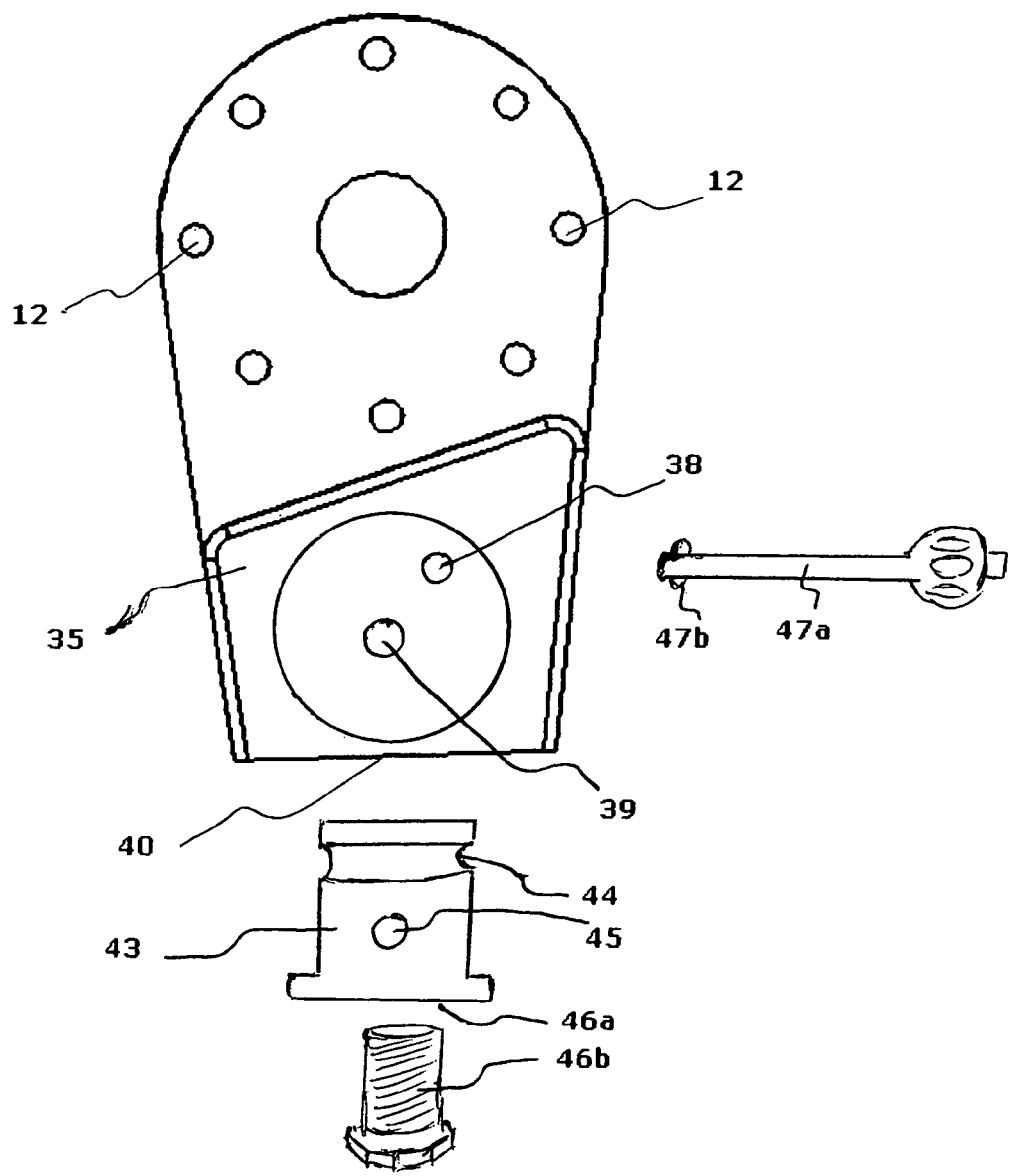
FIG. 6 Shows an interior view of stand alone foot member with shoulder engagement pins for detent locking registration with attachment stanchion ready to engage with the foot limbs underside receiving aperture.

FIG. 6 illustrates a detached foot member limb 35 displaying the male mating joint employing a circularly disposed plurality of male element ball headed pins 12, reduced in number to that of the female element 8 but similarly disposed in a circle about the pivot point 36. The engagement of opposing elements axially locks the pivoting limb 27, 35 when drawn into engagement by way of a screw shaft 10 driven through the joints centre 36,11. This permits various concatenated combinations of foot 35 and leg member 27 engagements about the collars 4,5a, allowing the unit to successfully transform its size, shape and centre of gravity through its various embodiments.

Figure 5:
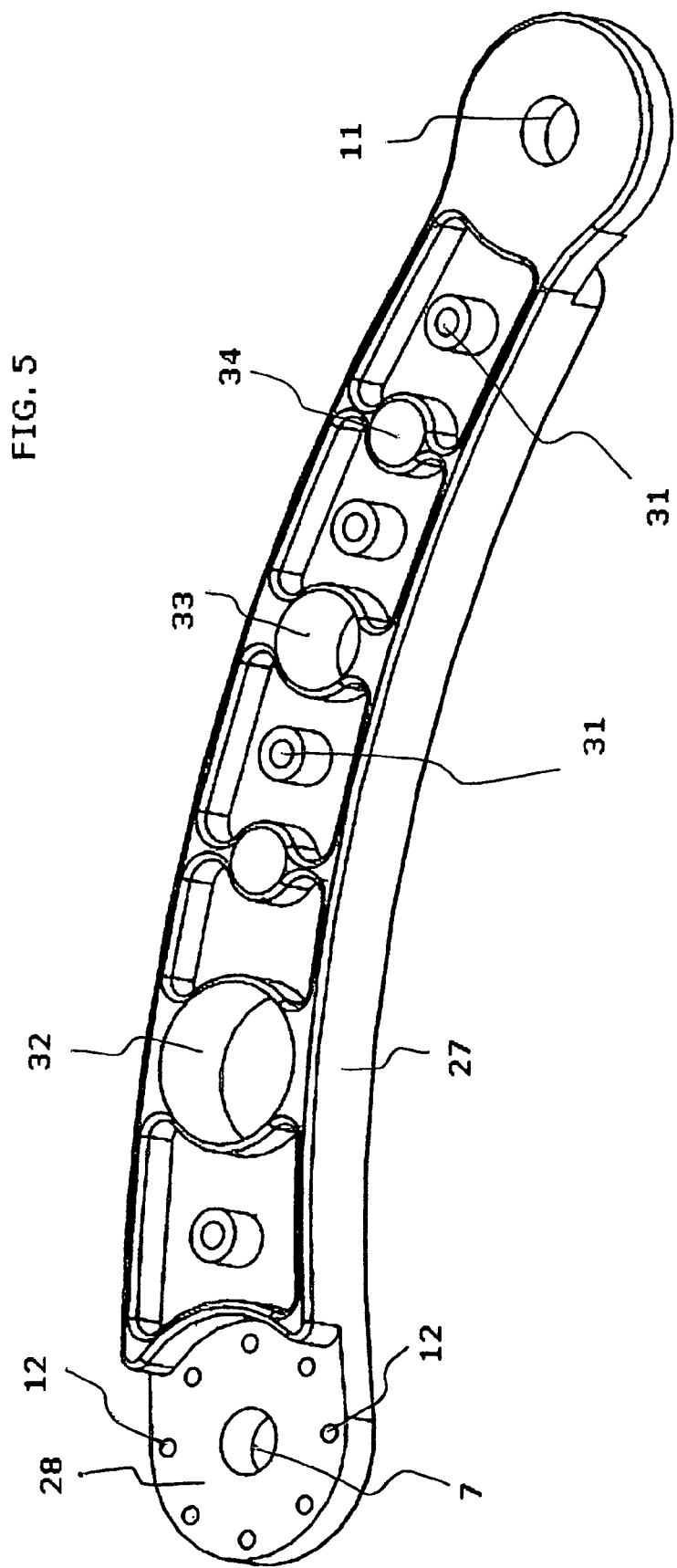
FIG. 5 Shows a central leg assembly perspective view of an inter-connection point with male element raised detent registration pins.

As shown in FIG. 5 each leg limb member employs a male element 28 of the of the joint engagement mechanism on its shoulder end and a female element 8 of the steel disc detent mechanism on its foot end. The two locking elements are positioned on each leg limbs opposing faces and are axially symmetrical.

Figure 3:
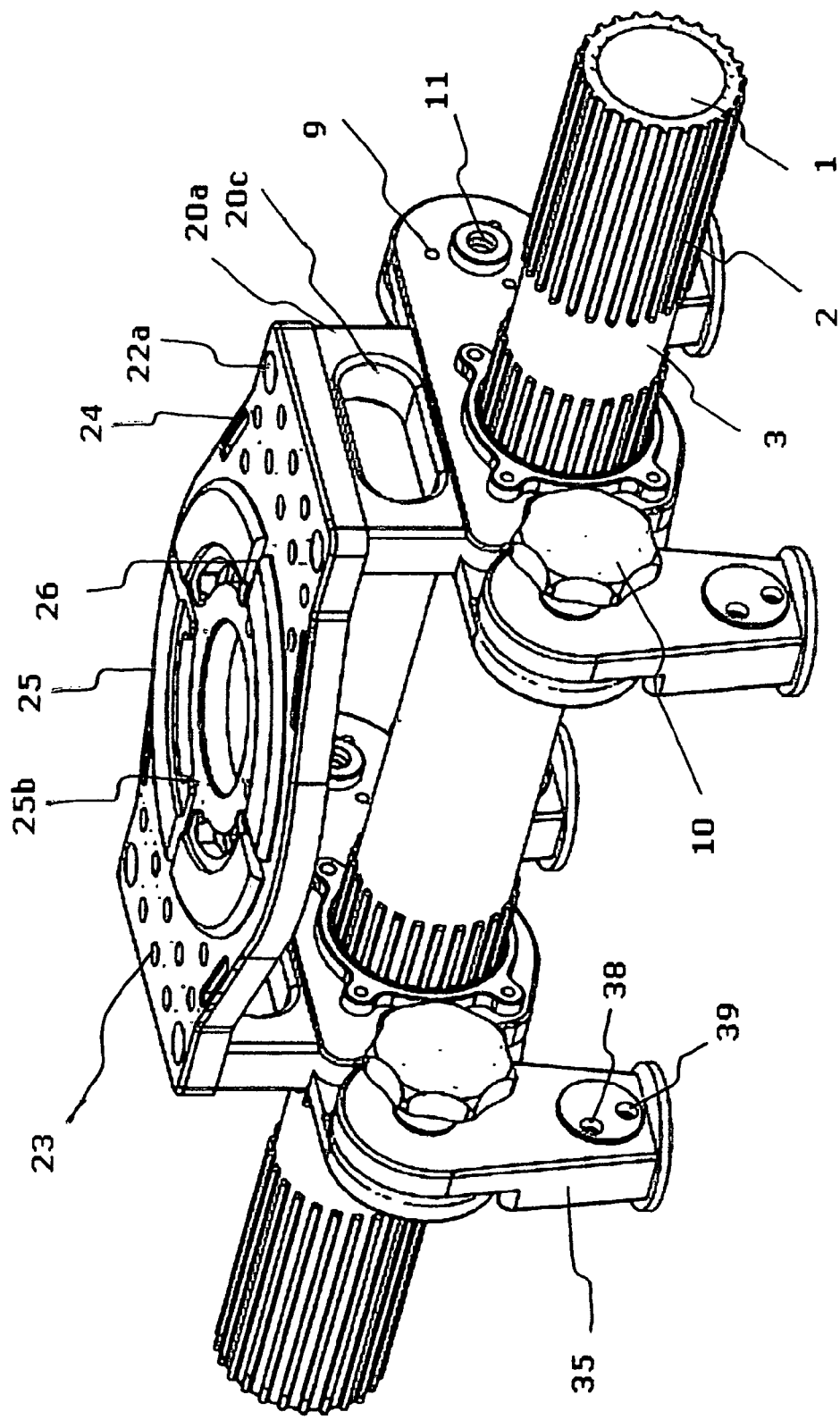
FIG. 3 Shows a side view representation of the unit in a low mode without the central leg limb members. The universal equipment mounting plate is directly mounting to the collars and foot limbs.

FIG. 3 illustrates the device's embodiment as a low level mount. To ensure sufficient clearance between the central frame member 1 and any locking nuts set about the equipment mounting plates 21 underside when standard pan and tilt heads are attached, a plate riser 20a may be employed. This bar straddles the length of the mounting collar 4, 5a, 6a and raises the height of the mating surface 15. Therefore increasing the void height below the equipment mounting plate 21 so that a Mitchell mount or a pan and tilt heads locating bolt aligned through the centre of the Mitchell plate receiver 25 can be assembled with its locating nut on the underside of the equipment plate. For applications when a Mitchell fitting 25 is not employed then there may be no need to employ the riser 20a, unless additional elevation is required. The riser 20a is positioned upon the top fixing face 15 of the mounting collars 4, 5a, 6a and aligns its two through holes 20b with that of the mounting collars receiving threaded holes 14a and similarly between the equipment mounting plates fixing through holes 22a. The passing of threaded bolts 22b extending down into the mounting plate 21 passing through the riser apertures 20b and into the collars 4, 5a, 6a locating holes 14a draws all three components together, sandwiching the risers. Each riser 20a is characterised by two elongate apertures 20c, these permit them to be used as grab handles allowing users to take hold and lift the device for positioning.

The limb sections of the unit are attached at circular articulation points 7 upon the mounting collar, each limb consists of concatenated elements of the limb group that includes one or more leg 27 sections and a foot 35 or a combination thereof.

The plurality of support limb sets 27, 35 used is determined by the size and weight of the mounted equipment and with regard to the physicality of the structure the device is to be mounted upon, or the locations environment. A plurality of limb 27, 35 sets longitudinally positioned along the length of the central frame member 1 ensures the optimum support, strength and stability of the device together with its mounted equipment. Single sided mounting collars 5a and attached limb sets 27, 35 act as individual support limbs, entirely independent from a bridged and arched like contra-lateral limb support.

FIG. 5 illustrates a leg limb displaying its distal inter-connection points 28, 8 on opposing faces and shows the variety of mounting and attachment points along its mesial length. A plurality of threaded holes 31 spatially positioned along the limb member's two opposing faces provide attachment points for industry standard accessories such as monitors, lamps and grip accessories.

Other circular through apertures 32,33,34 are located along the arms length, these reduce the arms mass, therefore reducing its weight. Plus they provide rigging and fixing points for common gauge tubes. The largest aperture accommodates a standard scaffold tube size 32, the intermediate sized aperture accommodating standard Speed-Rail® tubing 33. The smallest aperture 34 is for passing through standard camera accessory rods. Tubing passed through these apertures further aids the structural build and mounting of the device, allowing it to become a built in component of a mountings structure or simply assisting a temporary attachment.

The equipment mounting plate 21 provides a bridge between two sets of mounting/cap collars 4, 5a, 6a axially identical in rotational orientation and spatially apart along the central frame member. The mounting plate 21 is placed flat upon each collars flat top surface 15 and attached by means of threaded screws 22b passing through locating holes 22a in the plate positioned in alignment with the threaded holes 14a on the top face 15 of each mounting collar.

FIG. 3 shows an equipment mounting plate 21 raised upon risers 20a and comprises of a combination of a hi-hat base 21 and cheese plate 23, incorporating a centrally located stepped concentric ring configuration 25, providing circular locating insets, upon which standard camera mounts of Mitchell/Moy fittings, bowl mounts or pan and tilt heads can be attached for professional camera support. Stepped down varieties of 100 mm and 75 mm mounts for photographic and consumer users can also be attached. Attachment for flat base hi-hats and bowl mounts are accommodated by a plurality of recessed through holes 26 located on the plate's underside and positioned within the plate's concentric steps 25. A user requiring a plurality of cameras to be mounted upon the device preferably supplies each camera with its own independent mount and collar set, this allows each camera to be linearly displaced, independently along the central member and in any orientation about the central frame member 1.

The equipment mounting plates multiple apertures 23, arranged at spatially apart centres give it the cheese plate reference and the ability to attach and be rigged in a multitude of positions. The plate's four elongate side apertures 24 act as fixing points for threading webbed ratchet straps through the plate to securely tie down when positioning the device on irregular surfaces such as a vehicle.

The plate's corner through holes 22a can provide direct mounting onto any wheel set travelling slider/dolly system. Forming a low level travelling carriage for a supported camera. Alternatively the equipment plate 21 can function on its own as a hi-hat stand, a flat floor plate for attachment of a bowl receiving cup, for pan and tilt heads, or as a base plate for direct mounting upon scaffold.

FIG. 6 illustrates a separated foot member 35 and shows how its function is two-fold. Firstly to provide the articulating contact point between the device and the surface upon which it is to be positioned or mounted. Secondly, that of a locking mechanism and detachable inter-connection point for an assortment of standard attachment accessories, such as vacuum suction cups, clamps and scaffold clips, ratchet bands or wheel sets. These are attached to an inter-connecting stanchion 43 captured and held within the body of each foot member. The user's choice of foot attachment accessories is dependent upon the physical nature of the mounting surface and the devices intended embodiment. This may range from; a vehicle mount, scaffold mount, wheeled carriage for travel on linear rails or wire cable.

The releasable stanchions 43 are characterised by a threaded aperture 46a on the stanchions base. The stanchion 43 is attached to a chosen foot accessory by way of a threaded bolt 46b passing through the foot accessories attachment point and engaging with the threaded base aperture 46a. The stanchion 43 is then inserted into the foot's 35 female stanchion receiving aperture 40, located centrally on the foot's underside. Each foot's female receiving aperture is lined with a steel cylindrical sleeve to provide a resilient walled surface for the mating of the steel stanchion 43 insert.

Each stanchion's cylindrical shaft displays an upper third section of circumferentially rebated channel 44, This circumferential rebate is utilised as an engagement channel for the passing of an axially perpendicular retaining pip-pin 47a which passes through the body of the foot from either of the foot members outer facing edges, thus preventing an inserted stanchion to withdraw from the foot member's base aperture 40. The retaining pip pin 47a passes through the foot's body extending beyond the opposing outer surface. The retaining pins spring biasing ball 47b mechanism prevents withdrawal back through the sidewall aperture, until the spring biasing ball pin is released. The retaining pins perpendicular engagement position on the outer edge of the stanchion rebate channel 44 prevents withdrawal of the stanchion and permits rotational movement of the stanchion within the foot.

A secondary and centrally located perpendicular retaining pin aperture 39 is utilised to capture the stanchion 43 and prevent the stanchions rotation. Each stanchion comprises of a central through hole 45 in its body by which an aligned retaining pip pin 47a can pass through both sides of the foot and centrally through the core of the stanchion itself. There need only be one retaining pin 47a per foot, the choice of locking position 38, 39 is dependent on the foot attachments used. Alternate locking mechanisms can be utilised by those familiar in the art, for example, clamping mechanisms or hand knob mechanisms.

Assemblage can also be made employing industry standard lighting tool spigots as the stanchion element 43. These can be captured and held in place by means of the offset rebated channel 44 locking mechanism.

Figure 7:
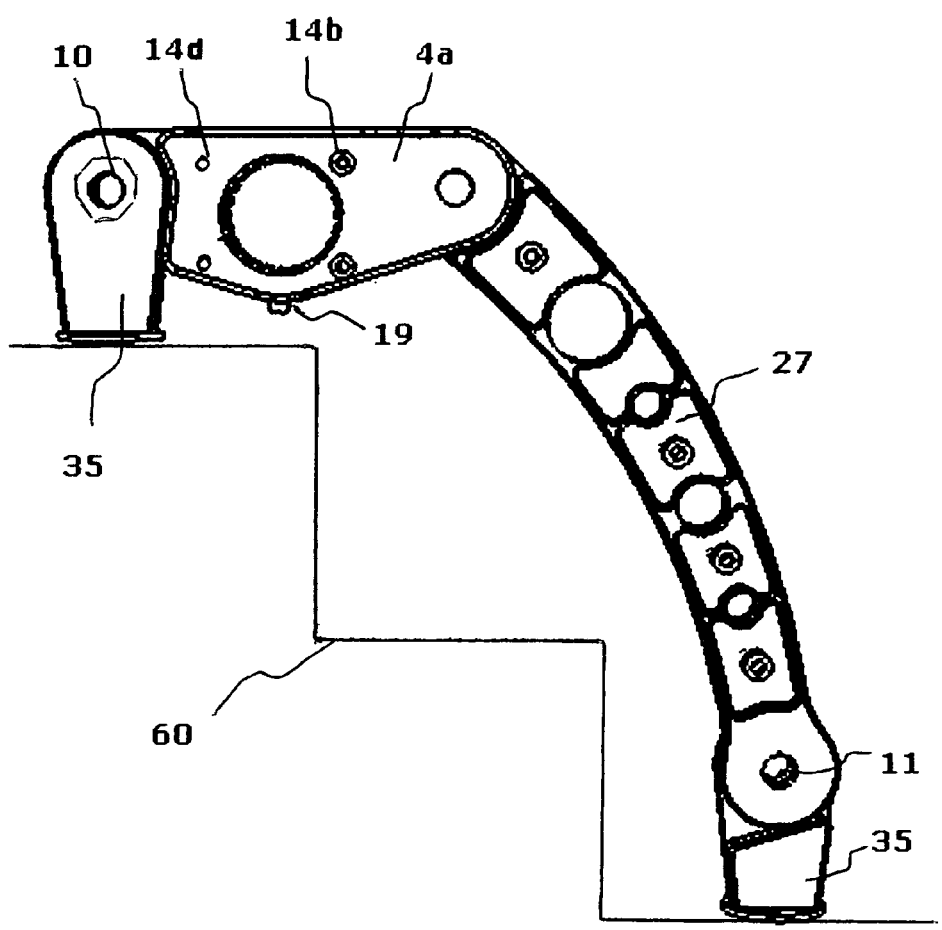
FIG. 7 Shows a side view of the devices limb components configuration and articulation to provide horizontal support on steps or uneven terrain.

FIG. 7 illustrates the device's embodiment as a self supporting mount upon uneven or stepped terrain, preferably requiring the central frame member 1 to be positioned in transverse alignment to a slopes or steps 60 downward direction. This ensures a horizontal axis for the central frame member. The height of which is determined by each legs angular relationship between the central frame and the base level.

Figure 8:
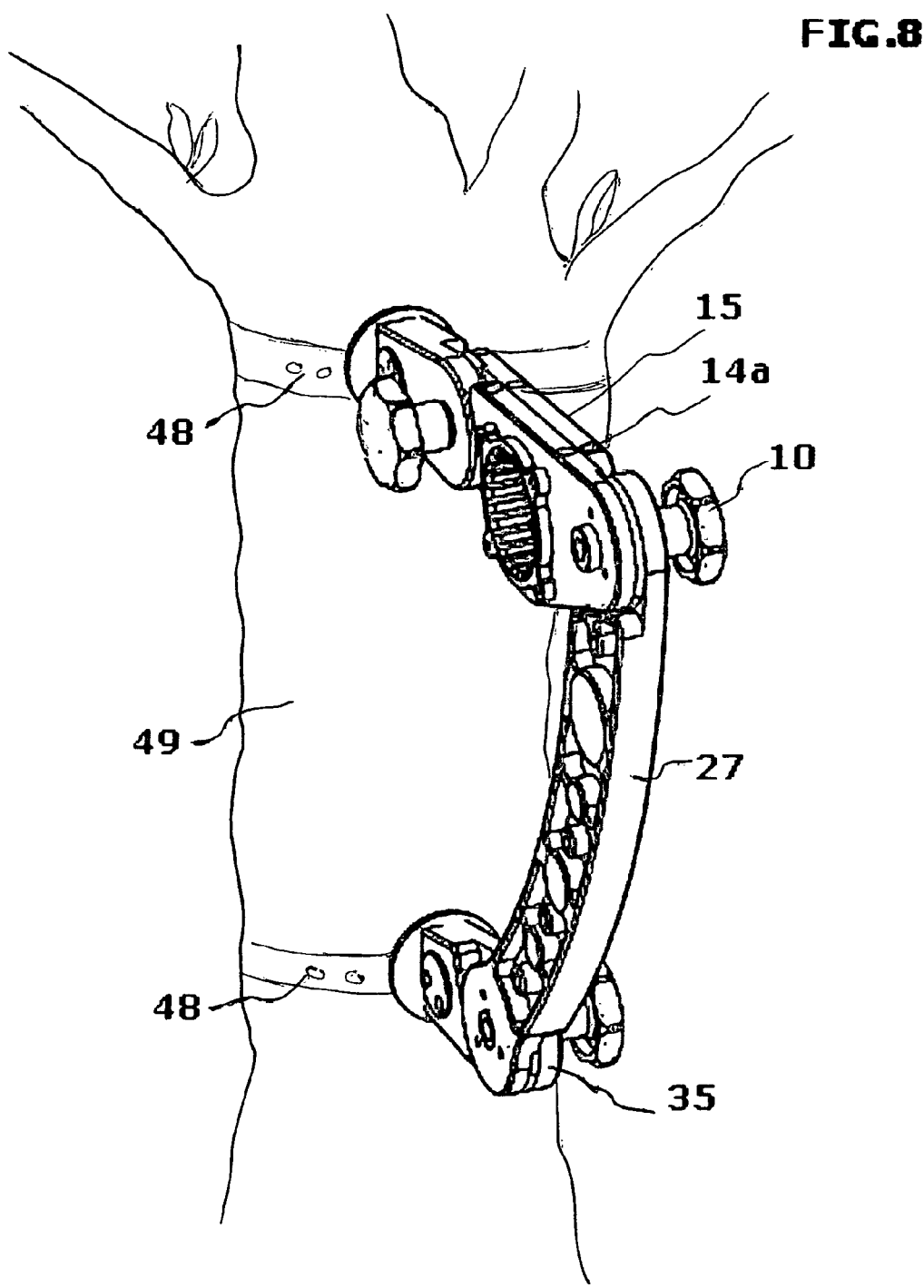
FIG. 8 Shows a side view of an alternate embodiment of a single axis support leg and foot member providing a vertical mounting onto a tree or sign post, scaffold pole by means of a ratchet straps or metal banding.

A further embodiment of the invention is shown in FIG. 8 and illustrates a side profile view of a cantilevered dual limbed support arm for lightweight cameras requiring positioning on vertical structures, notably, trees for wildlife and environmental monitoring. The use of a single or dual limbed 27, 35 configurations, positioned and attached perpendicular to the support structure, provides a bracket support that can be adjusted by means of the limbs members 27, 35 articulation joints, to form a desired support position either vertically or horizontally about the structure.

Attachment to any tree or post like structure in this manner is made by the foot members receiving stanchion 43 attaching to either, a ratchet strap, when positioned on trees, a scaffold clip when positioned on tubing, or metal ratchet straps when attached to lamp or signage poles.

Illustrated in FIG. 10 is the device's embodiment as an adjustable gauge linear track support. The placement of parallel rails 51 upon the transverse mounting collars 4, 5a, 6a in a manner that runs linearly with the central frame member 1 permits the device to support a movable dolly unit upon the rails 51 for controlled camera transport during a filming sequence. The chosen length of parallel rails 51 ideally matches the length of central frame member 1. A bar of T-slot profile channel can be secured on top of any collar mount 4, 5a, 6a at the distal ends of the selected rails construction. The T-slot profile channel extends beyond the collars 4,5a distal ends and defines the maximum gauge width of the running rails attached. The parallel rail 51 attachments is by means of two rail clamps 52 capturing and securing the rails 51. With regard to FIG. 9 illustration, each rail clamps 52 base surface consists of an attachment to a T-slot insert plate 54. The clamps sliding T-slot insert plate 54 is placed into the T-slot profile 52 and linearly positioned and secured by way of a screw 55 extending down into the channels aperture and locating with the threaded engagement hole 56 on the T-slot insert plate 54. This engagement draws the slidable insert plate 54 into abutment with the T-slot profiles 52 upper leading edge. This mechanism allows the user to determine the mounted tracks gauge width.

The rails clamps 53 consist of a rail aperture 57 with an inverted teardrop characteristic, a locking screw 58 extending downwards from the clamps upper face, through a threaded aperture 59 in the clamps wall to a central point in the rail aperture 57. The teardrop configuration permits varying gauges of tubing to be used for the rails element. Depending on the tubes diameter the vertical contact and resting point upon the downwardly converging sidewalls varies. The lateral position is always fixed maintaining the set position along the T-slot channel. A male threaded knob 58 passing downward into the aperture from the clamps top face and engaging with the inserted rails 51 outer circumferential face locks the rail in position, preventing vertical or lateral displacement.

The device's central frame member 1 acts as the transport carriage when constructed as a linear rails camera dolly. When placed transversely across two parallel linear rails 51, two sets of cap collars 6a provide the support for the equipment mounting plate 21. Wheel sets 50 to effectuate the linear travel are attached by one of two methods. Firstly by means of the wheel sets attachment to cap collar mounts 6a inverted and subtending the central frame member 1 and set at opposing ends of the frame member 1, as shown by FIG. 10. Their flat attachment face 15 and twin threaded apertures 14a facilitates attachment of wheels sets. The gauge width of the opposing rail 51 wheel sets are adjusted by altering each collars 6a position along the central frame member 1, and can be positioned to respond to the gauge of the track. This method ensures the height and centre of gravity for the device and supported equipment is fixed and kept low to the rails height. With regard to FIG. 11 an alternate method of construction consists of a fully constructed support mount with four limb sets, utilising a pair of dual collar mounts 4 for the limb sets attachment. Separate wheel sets are attached to each of the four supporting limbs foot members by means of the insert stanchion 43. The limb sets 27, 35 inter-connection mechanisms permit height adjustability of the mounted camera, without the need to raise and rebalance the parallel running rails 51.

In accordance with the provisions of the patents statutes, the principles and modes of operation of this invention have been explained and illustrated in its preferred embodiments. However, it must be understood that this invention may be practiced otherwise than as specifically explained and illustrated without departing from its spirit or scope.

I claim:

1. A versatile camera support mount comprising: a longitudinal central frame member,
   a plurality of longitudinal central frame mounting collar sets each with an integrated locking mechanism for securing each mounting collar set in a slidably linear position along the central frame member,
   a plurality of detachable support limbs, each limb consisting of elements of the limb group, which includes one or more leg sections and foot section or a combination thereof, each of which interconnects with mounting collars,
   a mounting collar assembly wherein the mounting collars means to interconnect the support limb groups to the central frame member, either singularly and independently or as sets of connected and opposing dual legged support consisting of,
   (i) each dual limb set interconnection and mounting collar assembly incorporating two mounting collar plates set back to back in congruence to each other, with identical & inter-changeable central frame profile engagement plates inserted between them, wherein the setting of identical single collar plates back to back places the support limbs interconnection points on opposing faces and opposing ends of the mounting collar sides,
   (ii) each single limb set interconnection and mounting collar assembly incorporating a single mounting collar plate set and fixed together with a collar cap plate, together with identical central frame profile engagement plates inserted between them,
   a plurality of inter-changeable collar insert profile engagement plates comprising a central aperture corresponding identically in shape and dimensions to the external shape profile of the longitudinal central frame member employed, permitting engagement, by means of the central frame member passing centrally through the aperture hubs of the plurality of linearly aligned mounting collars, the collars additionally providing Spatially apart threaded apertures upon the mounting collars uppermost face to align the attachment of equipment mounting plates, receiving T-slot channels or wheel sets, a universal equipment mounting plate positioned and secured upon a set of mounting collars set about the central frame member, either independently, on its own set of mounting collars or secured upon a set of mounting collars attached to independent single limb sets or mounting collars bridging dual limb sets.

2. A versatile camera support mount according to claim 1 wherein the integrated locking mechanism is that of a nylon threaded screw extending through the underside of the mounting collar passing through the engagement profile insert plate and abutting the central frame member.

3. A versatile camera support mount, according to claim 2~ wherein said central frame member's inter-changeable profile engagement plates is formed of acetyl or nylon.

4. A versatile camera support mount according to claim 3, wherein each mounting collar and limb member's component interconnection point comprises of opposing and matable elements of an articulated joint and releasable locking mechanism, providing limb member connection and perpendicular axial rotation about the pivotal connection point.

5. A versatile camera support mount according to claim 4, wherein said matable elements of a collar mount and limb components interconnection point consists of: (i) a circular plate incorporating a circular plurality of spatially apart female detent seats attached to each mounting collars shoulder, further more to one of each leg limbs lower distal end,
   (ii) a circular and lesser plurality of spatially apart, raised steel ball pin elements located upon the opposing distal shoulder to the leg limbs female element, furthermore upon each foot member's shoulder,
   (iii) a central threaded bolt, the pivot point, passing through the central aperture on the male elements circular steel ball pin component and engaging the threaded receiving aperture at the centre of the female elements circular detent seat component to draw together the two complementary elements, engaging the spatially aligned circular detents and raised ball pins into a locked and releasable linking mechanism.

6. A versatile camera support mount according to claim 5, whereby an inter-changeable central frame member acts as a linear bearing permitting a plurality of limb sets to be spatially positioned along the length of the central frame member, in both a symmetrical and irregular manner.

7. A versatile camera support mount according to claim 6 whereby a plurality of limb types may be attached to one another to form a long or angular leg profile, and further characterised by:
   (i) each leg limb incorporating an opposing male and female element of a complimentary circular detent seat and ball pin interconnection point at each distal end,
   (ii) each leg limb incorporates a plurality of threaded holes located along each legs mesial plane for affixing industry standard production instruments and equipment,
   (iii) each leg limb incorporates a selection of circular apertures along its length to facilitate passing through of various industry standard gauge tubes when rigging to structures,
   (iv) each leg limb member is arcuate in its length,
   (v) each limb and collar mounts interconnection points are located on opposing faces and opposing distal ends of each component and axially aligned with each other.

8. A versatile camera support mount according to claim 7, wherein each limbs foot component incorporates upon its shoulder end, the male circular ball pin arrangement, one half of the inter-connection locking mechanism, for direct connection to the mounting collar or a leg limb member's female circular detent seat element, providing the rotational adjustment point for the foot member's abutment with the ground or base level.

9. A versatile camera support mount according to claim 8, wherein each foot member furthermore incorporates a base-receiving aperture for the insertion and capture of a stanchion.

10. A versatile camera support mount according to claim 9, wherein said stanchion incorporates a rebated circumferential groove on its upper section, together with a perpendicular aperture passing centrally through the stanchions diameter at a lower section, each stanchion further comprises of a threaded base aperture for the inter-connective attachment of industry standard foot-pads, locking clips, suction pads or wheel sets.

11. A versatile camera support mount according to claim 10 wherein each loots outer sides incorporate two perpendicular retaining pin apertures, one of which is centrally aligned and of an equivalent size to locate within the stanchions lower section aperture, the second, positioned offset from the stanchions mesial plane and aligned with the stanchions upper section of rebated circumferential groove, permitting:
   (i) a single retaining pin passing through both sides of the loots proximally aligned aperture with that of the inserted stanchions proximal aperture, capturing the stanchion and restricting torsional movement,
   (ii) a retention pin passed through both sides of the offset perpendicular aperture, retaining an inserted stanchion by means of abutting the circumferential rebated groove, preventing the stanchions withdrawal and permitting the stanchions torsional rotation within the body of the foot member.

12. A versatile camera support mount according to claim 11 wherein said retaining pin means include a spring member applying a spring force biasing to an integrated ball.

13. A versatile camera support mount according to claim 12, wherein a plurality of independent equipment mounting plates may be set in linear alignment upon the central frame member by way of paired sets of collar cap mounts supporting each equipment mounting plate and furthermore the ability to be positioned at various incremental angular orientations about the central frame member.

14. A versatile camera support mount according to claim 13 wherein the equipment mounting plate height, relative to ground or base level can be incrementally altered by way of each support limb sets axial rotation about its circular detent interconnection points.

15. A versatile camera support mount according to claim 14 wherein a tubular splined central frame member is employed, the height of the equipment mounting plate relative to the ground or base level can be further altered, by means of disengaging the collar from the central frames tubular spline and circumferentially rotating the perpendicular engagement position of each independent single sided mounting collar and limb set and sliding each newly orientated collar into engagement with the splined portion of the interchangeable central frame member.

16. A versatile camera support mount in claim 14, furthermore for constructing a linear camera dolly rail system by mounting and pivotally securing at their distal ends, a plurality of equal length linear rails upon the limb supported central frame mounting collars, in an identically linear direction to the central frame member, acting as the principal bearing, engaged and secured through each mounting collars central profile plates engagement aperture, forming a longitudinal truss enclosure, the positioning of a plurality of linear rails secured upon the top section of the central frame mounting collars provides a spatially apart and parallel rail system for a wheeled carriage to be mounted and travel upon.

17. A versatile camera support mount according to claim 16 wherein the positioning and securing of said linear rails axially in parallel upon the transverse collar mounts located at each end of the central frame members required length is by way of a plurality of detachable, transverse and laterally adjustable rail clamps, connected to a detachable T-slot base plate for engagement and lateral positioning within a bar of receiving T-slot channel, mounted upon each mounting collar, permitting lateral positioning of the rails gauge width, generally in parallel.

18. A versatile camera support mount according to claim 17, wherein said wheeled carriage consists of an equipment mounting plate attached to sets of mounting collar caps, furthermore each mounting collar cap is threaded upon a central frame member, additionally a pair of independent and inverted mounting collar caps with complementary frame member engagement profile inserts are engaged, one upon each end of the central frame member, subtending the central frame member, each inverted and subtended mounting collar caps substantially flat bottom edge can then be attached to a carriage wheel set, the wheel sets gauge width can be adjusted by way of laterally positioning either one or both sets of inverted mounting collar caps along the central frame member at a position to match that of the parallel rail gauge width.

19. A versatile camera support mount according to claim 18, wherein said wheel sets consist of a plurality of concave wheels set about the linear rail in a triangular configuration of a dual extended and singularly subtended manner.

20. A versatile camera support mount according to claim 19, wherein the height of a travelling equipment mounting plate can be altered by means of changing the limb sets perpendicular angle of locked rotation within the inter\-connecting component locking mechanism, when utilizing a dual limb mounting collar configuration for support, together with wheel set attachments on each foot limb, when the travelling carriage's central frame member is positioned transversely to the parallel running rails.

21. A method for positioning and securing attachment of a cantilevered single axis limb set and dual mounting collar assembly upon a vertical surface comprising the steps of: and aligning perpendicularly to the vertical mounting surface a horizontally positioned dual plate mounting collar assembly with its radially outer facing limb inter-connecting point connecting to and securing with a single downwardly orientating and cantilevering limb set, comprising of a leg limb plus a foot limb;

articulating and locking in position at each of the outer limb sets matable joints forming a single subtended and cantilevering limb set, mounting and securing the cantilevering limb set to the vertical mounting surface by attaching ancillary vertical surface affixing accessories to the generally perpendicularly aligned foot stanchions base receiving thread; and positioning and mounting the ancillary vertical surface affixing accessories to the vertical surface, locating and engaging the stanchion into the foot members base receiving aperture and engaging the locking mechanism, connecting of a second limb set to the radially inner position of the dual mounting collars limb inter- connecting point, axially aligning the separate limb sets foot members generally perpendicularly with the vertical affixing surface, attaching and securing the foot members releasable stanchion generally perpendicularly to the vertical surface by means of ancillary vertical surface affixing accessories engaging with the foot stanchions receiving thread, locating and engaging the vertical surface mounted stanchion into the foot members base receiving aperture and engaging the locking mechanism, and causing attaching and abutment of the vertical support surface together with the single axis limb sets.

\* \* \* \* \*